US010555047B2

(12) United States Patent
Murugan

(10) Patent No.: US 10,555,047 B2
(45) Date of Patent: *Feb. 4, 2020

(54) REMOTE ENGAGEMENT SYSTEM

(71) Applicant: Chandrasagaran Murugan, Morningside (ZA)

(72) Inventor: Chandrasagaran Murugan, Morningside (ZA)

(*) Notice: Subject to any disclaimer, the term of this patent is extended or adjusted under 35 U.S.C. 154(b) by 0 days.

This patent is subject to a terminal disclaimer.

(21) Appl. No.: 15/667,031

(22) Filed: Aug. 2, 2017

(65) Prior Publication Data

US 2018/0146262 A1  May 24, 2018

Related U.S. Application Data

(63) Continuation of application No. 14/358,174, filed as application No. PCT/IB2012/056478 on Nov. 16, 2012, now Pat. No. 9,756,399.

(30) Foreign Application Priority Data

Nov. 16, 2011 (ZA) .................................. 2011/08416

(51) Int. Cl.
| | | |
|---|---|---|
| H04N 7/173 | (2011.01) |
| H04N 21/647 | (2011.01) |
| H04N 21/41 | (2011.01) |
| H04N 21/442 | (2011.01) |
| H04N 21/475 | (2011.01) |
| H04N 21/414 | (2011.01) |
| H04N 21/4788 | (2011.01) |
| H04L 12/18 | (2006.01) |

(52) U.S. Cl.
CPC ... *H04N 21/64746* (2013.01); *H04L 12/1895* (2013.01); *H04N 21/4126* (2013.01); *H04N 21/41415* (2013.01); *H04N 21/44218* (2013.01); *H04N 21/4758* (2013.01); *H04N 21/4788* (2013.01)

(58) Field of Classification Search
CPC .......... H04N 21/252; H04N 21/41415; H04N 21/42201; H04N 21/42203; H04N 21/4758
See application file for complete search history.

(56) References Cited

U.S. PATENT DOCUMENTS

2007/0156883 A1* 6/2007 Rosenberg ...................... 725/51
2007/0214471 A1* 6/2007 Thompson ...................... 725/51

* cited by examiner

*Primary Examiner* — Pankaj Kumar
*Assistant Examiner* — Timothy R Newlin
(74) *Attorney, Agent, or Firm* — W&C IP

(57) ABSTRACT

A remote engagement system for a live event includes at least one output device located at the live event for providing an audio and/or visual output to people at the live event. A controller receives signals transmitted from a plurality of user input devices and in response thereto and in real time or near real time, controls the at least one output device located at the live event to provide an audio and/or visual output to people at the live event.

8 Claims, 4 Drawing Sheets

REMOTE ENGAGEMENT SYSTEM

CROSS-REFERENCE TO RELATED APPLICATIONS

This application is a continuation application of U.S. Ser. No. 14/358,174 filed May 14, 2014, now U.S. Pat. No. 9,756,399, and that application was a national stage filing under Rule 371 of PCT/IB2012/056478 filed Nov. 16, 2012, claiming priority to South African Application 2011/08416 filed Nov. 16, 2011.

BACKGROUND OF THE INVENTION

The present invention relates to a remote engagement system for a live event.

Remote viewers of live events have no way of conveying support and discontent to even protagonists such as sports teams, sports personalities, entertainers etc and engaging with the live audience to join in elation, dissatisfaction and jeers at various incidents occurring at the live event.

The present invention seeks to address this.

SUMMARY OF THE INVENTION

According to one example embodiment there is provided a remote engagement system for a live event including:
  at least one output device located at the live event for providing an audio and/or visual output to people at the live event;
  a controller for receiving signals transmitted from a plurality of user input devices and in response thereto and in real time or near real time, controlling the at least one output device located at the live event to provide an audio and/or visual output to people at the live event.

A plurality of input devices located remotely from the live event for receiving a user input and in response thereto transmitting a signal in real time or near real time over a communications network.

In one example the controller controls the at least one output device to provide an audio and/or visual output that is related to the number of signals received from the plurality of input devices. Thus, the larger the number of signals received from the plurality of input devices the larger the audio and/or visual output.

The at least one output device can be speakers.

The at least one output device can be a display screen.

According to another example embodiment there is provided a remote engagement method for a live event including:
  receiving signals transmitted from a plurality of user input devices;
  in response thereto and in real time or near real time, controlling at least one output device located at the live event to provide an audio and/or visual output to people at the live event.

DESCRIPTION OF EMBODIMENTS

Referring to the accompanying Figures, a remote engagement system 10 for a live event is illustrated.

The live event could be any live event such as a sporting event or a live performance to name but two examples.

The system 10 includes at least one output device 12 located at the live event for providing an audio and/or visual output to people at the live event.

The at least one output device 12 could be one or more video resources in the form of display screens and/or one or more audio resources in the form of speakers depending on the nature of the live event and the number of people attending.

In the illustrated embodiment two display screens and two speakers are illustrated but obviously this will vary accordingly.

A controller in the form of server 14 is arranged to receive signals transmitted from a plurality of user input devices 16a-16d and in response thereto and in real time or near real time, to control the at least one output device 12 located at the live event to provide an audio and/or visual output to people at the live event. This will be described in more detail below.

The server 14 has a database 26 associated therewith for storing data.

The plurality of input devices 16a-16d are located remotely from the live event. Thus, it will be typically located at a place where viewers are watching the live event remotely, for example by television.

Figure 1:
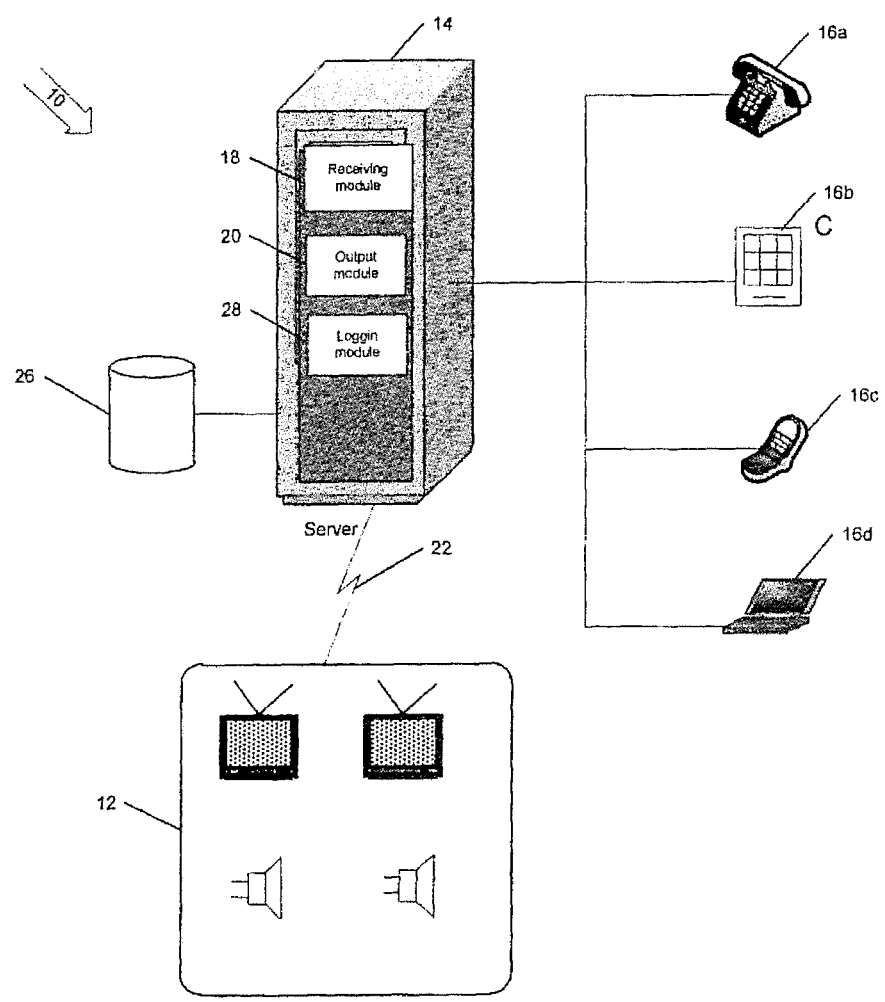
FIG. 1 shows an example system for implementing an embodiment of a remote engagement system for a live event.
Figure 2:
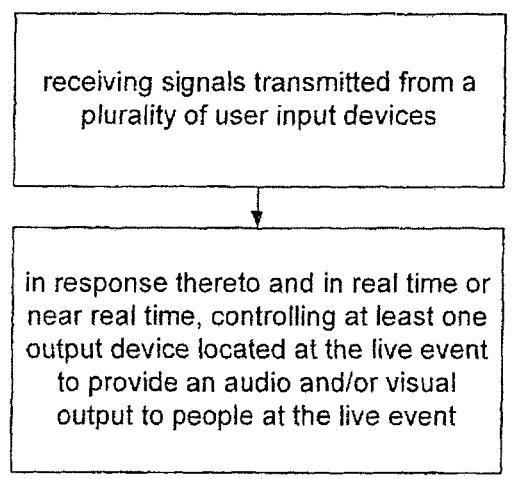
FIG. 2 shows an example method implemented by the system of FIG. 1.

The plurality of input devices 16a-16d could take any one of a number of forms and some examples of input devices are illustrated in FIG. 1.

The input devices could be a telephone 16a, a keypad 16b, a cellular telephone 16c or a computer 16d to name but a few examples.

In the example of the telephone or cellular telephone, a user wishing to provide feedback to the people at the live event will dial a certain number or send a data message using the cellular telephone 16c to a certain number which will be transmitted over a telephone network to a receiving module 18 of the server 14.

The server 14 includes a number of modules to implement an example embodiment.

In one example embodiment, the modules described below may be implemented by a machine-readable medium embodying instructions which, when executed by a machine, cause the machine to perform any of the methods described above.

In another example embodiment the modules may be implemented using firmware programmed specifically to execute the method described herein.

It will be appreciated that embodiments of the present invention are not limited to such architecture, and could equally well find application in a distributed, or peer-to-peer, architecture system. Thus the modules illustrated could be located on one or more servers operated by one or more institutions.

It will also be appreciated that in any of these cases the modules form a physical apparatus with physical modules specifically for executing the steps of the method described herein.

Alternatively or in addition, an application could be run on the cellular telephone to provide the user with touch screen user input options or the user may use the cellular telephone to access a webpage to input their selections.

In any event, in another embodiment, the user selects one or more buttons on a keypad 16*b* and the user selection is then transmitted via a communications network to the receiving module 18 of the server 14. The keypad 16*b* could be the keypad that forms part of a remote control for a television.

The user may use a computer 16*d* as the input device. In one example, the input is transmitted over a communications network in the form of the Internet to the receiving module 18.

Other input devices could also be used. For example, a sound sensor could detect the sound of the viewer clapping or booing at the remote location and an appropriate message is then transmitted over the communications network to the receiving module 18.

Another example user input device is a tablet running an application to provide the user with touch screen user input options or by mean of which the user access a webpage.

Alternatively or in addition, TVs are built with options and accessories to engage with audio and video resources at events. As an example a TV with live resource engagement options would be able to deliver the live sounds from a living room to an event. The sound will be managed by the core controllers of the system to blend positively and enrich the experience at the event and for the remote engagement supporters from distant living rooms.

Finally, a specialised input device could be used such as a garment. In one example the garment could be glove/s that the viewer wears that measures when the viewer is clapping and transmits an appropriate message. The glove/s are they have pressure sensors therein or include a circuit that the shorted when the user makes a certain movement. For example, if the user clenches their fist this may indicate clapping. Alternatively, actual clapping is measured.

The user inputs could signal the viewer's appreciation or disparagement of an occurrence at the live event.

Thus the viewer's response could be an emotive response for example a happy response such as applause or a derogatory response such as "booing".

Thus the viewer will select a different input for a positive or a negative response. In one example, the positive response may be the number 1 on the keypad or telephone whilst a negative response may be a number 2.

Where required, the viewers may be asked to register before their inputs will be accepted.

The server 14 includes an output module 20 to control the output devices 12 to provide the audio and/or visual output 24.

The server 14 is typically connected to the audio and/or visual outputs 12 via a communications network 22 which may be hardwired or a wireless network.

The output devices 12 then in response electronically generate an output such as the sound of applause.

The output module 20 manages the output at the event so that the audio and/or visual output provided is related to the signals received from the plurality of input devices 16.

Thus, in one example, the larger the number of signals received from the plurality of input devices 16 the larger the audio and/or visual output.

In another example, the higher the content of the received signal the larger the audio and/or visual output. This will apply for example where the user records their own voice for transmission in which case fewer users may produce a result that is higher than more users who are not shouting as loudly.

For example, where the output is an audio output the audio level of the output will be relatively louder if the number of signals received is relatively larger. It will be appreciated that this simulates real clapping at the live event where typically the more impressive an incident, the louder the live audience clapping will be up to a maximum volume like clapping.

Importantly, all of the above needs to occur in real time or near real time so that the output is received as soon as possible after the occurrence of the incident that prompted the remote viewer response.

Incidents could be a goal in a soccer match, a try in a rugby game, sending off of a player or a good play such as hitting 6 runs in a cricket game to name but a few examples.

Various types of audio feedback at the event could be included such as synthetic sound, user customized sounds and live sounds.

Synthetic sounds are generated and are recorded and stored on a storage solution linked to the controller system that facilitates engagement of audio and video resources at an event. The users can then select sounds remotely from a list of sounds and trigger the sound appropriately.

The sounds from multiple input users are managed by the controllers, distributed appropriately to audio resources and integrated with the live sound at the event.

User customized sounds can be implemented where a user records custom sounds to be played at the event. Sounds are recorded and stored on a storage solution linked to the controller that facilitates remote engagement of the audio resources at an event. The customs sounds are linked to a user's profile and accessed via a website or custom application Finally, in a live sound option fans will be able to deliver their real applause and support utterances from a remote location to the event in real time or near real time. Remote audio resources at the event will be able to deliver the live support of fans and users in real time from anywhere that has the necessary network connectivity (such as internet connectivity). The live remote sounds of fans will be aggregated and distributed by the controller system that manages the audio and video resources that the event.

On the visual feedback there are also various options available.

For example, the visual feedback could be a visual indication of a dial with a needle that moves up and down depending on the inputs received. The needle could move dynamically as the inputs change so that the needle will be moving up and down as the amount of inputs increase and decrease.

In another example, the visual feedback could include a graphic indicator of a happy or sad person with a related number or graph showing how many happy or sad inputs have been received. It is envisaged that this will also dynamically change as the number of inputs alter.

Fans will be able to access and utilize applications that have access to video and graphical resources at an event. An example of a video resources service would be a global Mexican wave that fans and users can participate in with an output of the participation displayed on video resources at an event.

It will be appreciated that in both the audio and/or visual embodiments, there may be two displays and/or to audio outputs, one for each team.

It will be further appreciated that in some embodiments both audio and visual outputs could be used where for example, and applause sound is played via speakers to the crowd whilst the display indicates the level of applause received.

In the case of an audio output, ambient noise sensors at the event in one embodiment are used to ensure that the audio output is matched to the ambient noise at the stadium. Thus if the stadium crowd is quiet the audio output will be relatively lower whereas if the stadium crowd is noisy the audio output will be relatively higher.

The controller in the form of server 14 will receive resource requests and manage output to resources. The controller functions include the following:
1. Sound Filtering
2. Max sound volume
3. User engagement logging
a. Points tallying for loyalty services
b. Verification of user engagement
c. Timeless record of engagement
4. Scheduling and blending engagement services
5. Distribution, by load etc
6. Advanced features A logging module 28 logs all user activities. The logs will be available to users on request to verify remote participation. Additionally a points scheme can be derived for fan activity on the system. Points will be tallied for loyalty services and competitions.

Figure 3A:
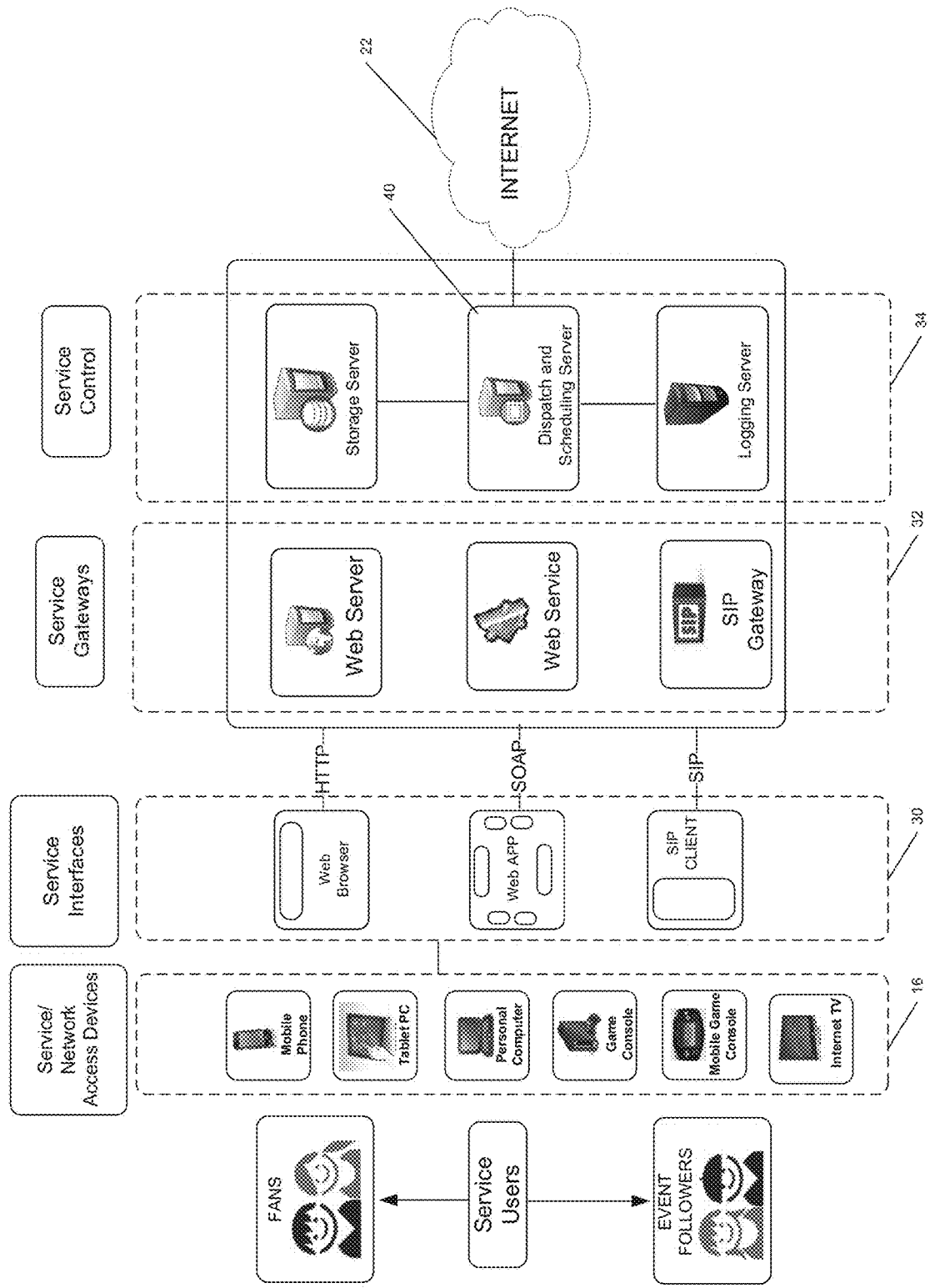
FIGS. 3a-3b show other example systems for implementing an embodiment of a remote engagement system for a live event.
Figure 3B:
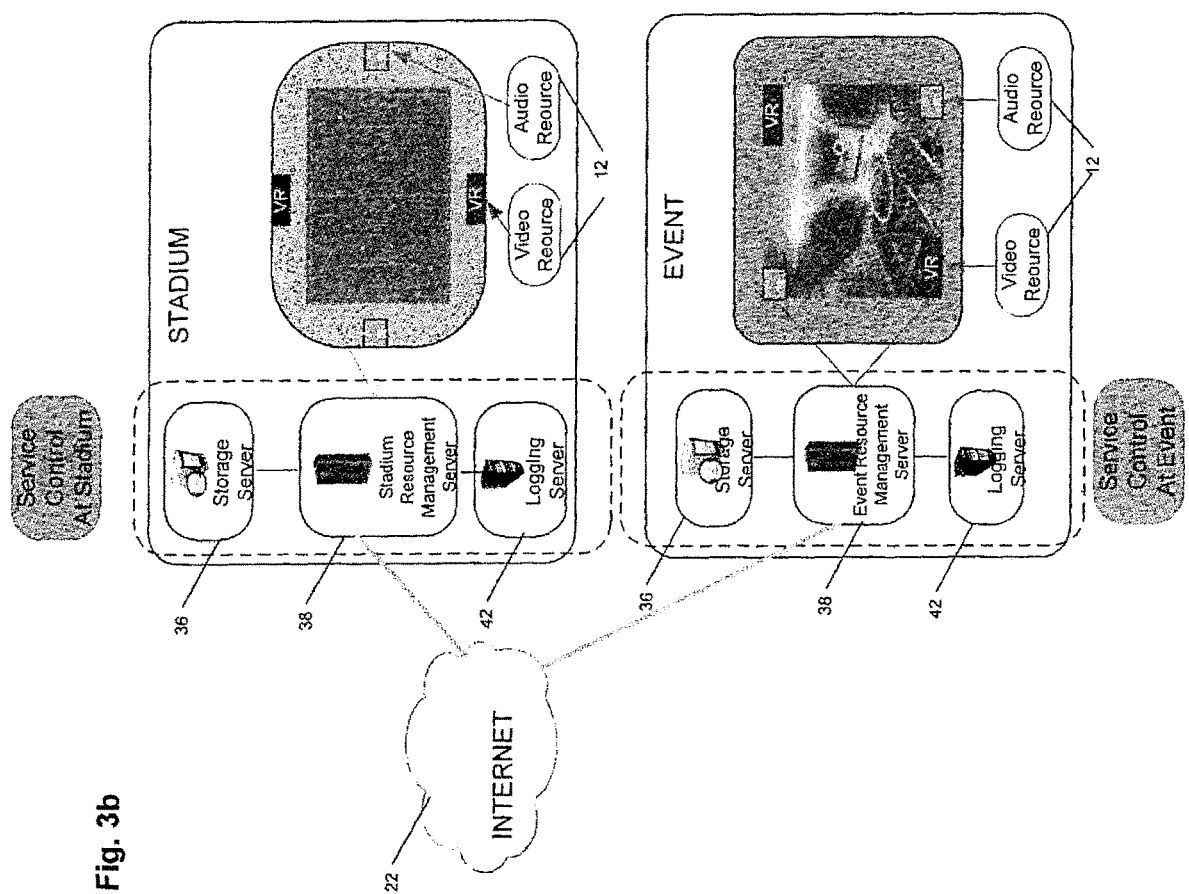

Referring to FIGS. 3*a* and 3*b*, an example embodiment of the invention is described in more detail.

A user accesses a service request input web page via a web browser 30 on a web server 32 using HTTP over a network such as the Internet.

It will be appreciated that the network can be the Internet and/or another IP based network for example a GSM based network or other type of network that facilitates the access of resources remotely.

The accessed web page has HTML input elements such as buttons. The web page is prepared in a version of HTML that can include HTML version 5 and future HTML versions.

Alternatively, input options for services are requested via a custom application that accesses a custom Web Service over a network such as the Internet. The Web Service has access to output resources at a Sports Venue or Event Location. Web Service standards and protocols are used in developing the system.
a. The application is typically developed in Java to facilitate easier access to input device components such a microphone.
b. The applications can be also developed in other languages including C++
c. Services initiated or requested via the application are typically delivered via a Web Service. The remote access device running the application uses XML, HTTP and/or SOAP (Simple Object Access Protocol) to make requests from the application, to activate services. Other Web Service platform elements such as WSDL are also used where necessary.

The input options on the web page or application are engaged to initiate audio, video and graphics based services over a network such as the Internet.

Audio services include generic recorded sounds. These are pre-recorded sounds such as the sound of clapping, cheers, booing, sighs etc. Sound files are stored in a storage service 36 at the event or stadium and is linked to an event/stadium resource management server 38. This reduces network traffic and bandwidth utilization for the service. The event/stadium resource management server 38 and sound files can also be off site but must maintain network connectivity to the audio and video resources 12 over a network such as the Internet It will be appreciated that the event/stadium resource management server 38 fulfils at least part of the function of the output module 20 of FIG. 1.

Generic Video/Graphical services can include a remote global Mexican Wave.

A global Mexican wave occurs where users around the world participate by engaging inputs in manner that produces a graphical/video representation of a Mexican wave at a stadium.

When an input option is engaged by the user, a software service request instruction is prepared depending on the service type requested and sent to a dispatch and scheduling component that resides on a dispatch and scheduling server 40. In a typical deployment the web server component and dispatch and scheduling server component will be installed on the same server. The dispatch and scheduling server can receive:
a. a single service request instruction from a user
b. multiple service requests from a single user
c. single service request from multiple users
d. multiple service request from multiple users The dispatch and scheduling server 40 aggregates requests and schedules delivery of requests to an event/stadium resource management server 38.

Thus it will be appreciated that in this embodiment the server 14 illustrated in FIG. 1 is distributed over a plurality of servers.

Requests are delivered from the dispatch and scheduling server 40 to the event/stadium resource management server 38 over an IP based network. TCP, UDP and SCTP (Stream Control Transmission Protocol) are used to manage delivery of requests depending on service type. Services also make use of SIP (Session Initiation Protocol) where necessary to improve effectiveness.

The event/stadium resource management server 38 receives the aggregate service requests, unpacks and interprets the requests, and passes instructions to audio, video and other resources 12 depending on the services requested.

A user's activity is logged on a logging server 42 that is linked to the event/stadium resource management server 38 for verification and additional services such as points for participation for users.

The event/stadium resource management server 38 is typically connected to the audio resource 12, video resource 12 and any other resources in one of the following ways:
a. Via an IP based network
b. Via wireless protocol based access at the event/stadium
c. Via cables
d. Audio resources can have additional components such as amplifiers and sound filters A live sound service enables users to transmit live audio support sounds, such as sounds of elation or disappointment remotely to an event or stadium by using the necessary networked enabled devices and software. A live service user accesses a live service application (Web App) that is installed on an Internet enabled device 16 such as a smart phone or tablet PC, for example.

The Web App can in part be a SIP (Session Initiation Protocol) client or must be able to access a SIP client on the Internet enabled device. This is to establish connectivity to a SIP Gateway appliance over an IP network such as the Internet to be able to access and use the live sound service at the event or stadium.

A signalling component prepares the connection to the audio resource at an event or stadium.

Live sound, like the live sound on a phone call, is transmitted to the audio resources at an event or stadium.

The live sound service is essentially half duplex and operates similarly to a large scale push to talk over IP service, but sound is transmitted to a stadium or event only, and not in the reverse direction. The live sound media is delivered using RTP (Real Time Protocol) and SRTP (Secure Real Time Protocol) where necessary. Other real-time data delivery protocols will be utilized when necessary to improve the effectiveness and efficiency of the system.

Where necessary also, the signalling and live sound media passes through the event/stadium resource management server 38 to access the audio resources 12 at an event or stadium.

A live service user can also activate the live sound service via a web page. An input control button on the web page when activated uses the microphone of the network access device to transmit live sounds. SIP and RTP or SRTP is typically used to establish connectivity to audio resources at an event or stadium to deliver the live sound in real time.

A recorded sound service enables a service user to record support sounds such as cheers or disappointment sounds such as "boos" in their own voice and to store it on a storage unit either at the stadium/event or in a cloud computing infrastructure that is linked to the system.

Recorded Sound service users, record support sounds in their own voices and store the sound files on a storage unit that is linked to the system.

The recorded sound is also linked to the system profile of the service user that recorded the sound. Service users can manage access to the sound files they create.

Access to services that play that the recorded sounds at stadiums and events are available via a web page or custom applications developed for the various platforms such as Android, Apple IOS etc.

From a web page the recorded sound user selects and activates a recorded sound to be played at the stadium. The request is submitted using HTTP over a network such as the Internet.

The request is received and processed by a web server and passed to the dispatch and scheduling server 40 where requests are aggregated if necessary and scheduled for dispatch to the event/stadium resource management server 38.

The delivery of the resource requests, together with the delivery of the media file that contains the users recorded sound, to the event\stadium resource management server is managed by the dispatch and scheduling server 40.

For network efficiency and reduced bandwidth utilization for the recorded sound service, a caching server that caches media files to prevent unnecessary retransmissions, is linked to the event/stadium resource management server and activated when necessary.

Communication for the recorded sound service between the dispatch and scheduling server and the event/stadium resource management server is established over a network that is IP based with UDP, TCP and/or SCTP managing data flow. SIP and RTP will be used when necessary to improve the effectiveness and efficiency of the recorded sound service.

An event or stadium can have multiple groups of event/stadium resource management servers linked to multiple groups of resources to support more than a 100 million service users concurrently if necessary and improve resiliency. Similarly multiple service gateways dispatch and scheduling servers and other system elements can also be deployed for a stadium or event to improve system resiliency to increase service and user concurrency.

Thus it will be appreciated that remote viewers of live events will have a way of feeding back to people actually present at the live event their satisfaction or dissatisfaction at various incidents occurring at the live event.

The invention claimed is:

1. A remote engagement system for a live event broadcast from a venue, including:
    at least one output device located at the venue during the live event broadcast for providing an audio and/or visual output to people at the venue, wherein the live event is selected from the group consisting of a sporting event or a live performance; and
    a controller for
        receiving signals transmitted from a plurality of user input devices located remotely from the venue, wherein at least some of the user input devices are operable only by a single user at a time, and wherein at least some of the plurality of user input devices are located remotely from one another,
        counting a number of signals received from the plurality of user input devices, and
        in response to the number of signals counted and in real time or near real time, controlling the at least one output device located at the venue to provide an audio and/or visual output to people at the venue that is related to the number of signals received from the plurality of user input devices so that the larger the number of signals received from the plurality of user input devices the larger the audio and/or visual output from the at least one output device, wherein at least participants in the live event or the people at the venue watching the live event see or hear the audio and/or visual output from the at least one output device.

2. The system of claim 1 wherein the at least one output device is one or more speakers that output a sound.

3. The system of claim 1 wherein the at least one output device is one or more display screens that output a graphical and/or video output.

4. A remote engagement method for a live event broadcast from a venue, comprising the steps of:
    receiving signals transmitted from a plurality of user input devices which are located remotely from the venue, wherein at least some of the user input devices are operable only by a single user at a time, and wherein at least some of the plurality of user input devices are located remotely from one another;
    counting a number of signals received from the plurality of user input devices; and
    controlling at least one output device located at the venue to provide an audio and/or visual output to people at the venue that is related to the number of signals received from the plurality of user input devices so that the larger the number of signals received from the plurality of user input devices the larger the audio and/or visual output from the at least one output device, wherein the at least one output device is positioned so that at least participants in the live event or the people at the venue watching the live event see or hear the audio and/or visual output from the at least one output device, wherein the live event is selected from the group consisting of a sporting event or a live performance.

5. The method of claim 4 wherein the at least one output device is one or more speakers that output a sound.

6. The method of claim 5 further comprising the step of permitting one or more of the plurality of user input devices to select the sound which is output by the one or more speakers.

7. The method of claim 4 wherein the at least one output device is one or more display screens that output one or more graphical and/or video displays.

8. The method of claim 7 further comprising the step of permitting one or more of the plurality of user input devices to select one of the one or more the graphical and/or video displays output on the one or more display screens.

* * * * *